United States Patent
Hicks et al.

(10) Patent No.: US 7,011,317 B1
(45) Date of Patent: Mar. 14, 2006

(54) CART WHEEL WITH BEARING COMPONENTS

(76) Inventors: E. David Hicks, 7 Oak Run Ct., Mansfield, TX (US) 76063; Jimmy L. Hicks, 3315 Hollow Creek Rd., Arlington, TX (US) 76017

( * ) Notice: Subject to any disclaimer, the term of this patent is extended or adjusted under 35 U.S.C. 154(b) by 187 days.

(21) Appl. No.: 10/440,987

(22) Filed: May 19, 2003

Related U.S. Application Data

(63) Continuation-in-part of application No. 10/233,178, filed on Aug. 29, 2002, now abandoned.

(51) Int. Cl.
*B62D 39/00* (2006.01)
(52) U.S. Cl. .............................. 280/33.991; 280/47.24; 301/5.7
(58) Field of Classification Search ............. 301/105.1, 301/5.7, 124.1, 111.1; 280/47.24, 47.26, 280/47.27, 33.991, 33.992, 33.994, 33.997, 280/DIG. 4
See application file for complete search history.

(56) References Cited

U.S. PATENT DOCUMENTS

| | | | | |
|---|---|---|---|---|
| 992,713 | A * | 5/1911 | Gilman ........................ 384/547 |
| 1,338,091 | A | 4/1920 | Pearson |
| 1,482,579 | A | 2/1924 | Nice |
| 2,885,821 | A | 5/1959 | Frick |
| 3,490,773 | A * | 1/1970 | Dennison .................... 277/419 |
| 3,666,322 | A * | 5/1972 | Pickron ................. 301/64.701 |
| 3,807,817 | A | 4/1974 | Black |
| 3,895,844 | A * | 7/1975 | Merbler ....................... 301/5.7 |
| 4,072,373 | A * | 2/1978 | Black .......................... 384/537 |
| 4,095,846 | A * | 6/1978 | Agins .................... 301/37.104 |
| 4,113,328 | A | 9/1978 | Vander Meulen |
| 4,361,367 | A * | 11/1982 | Statz .......................... 384/302 |
| 4,592,595 | A * | 6/1986 | Freeman .................. 301/5.308 |
| 4,824,137 | A * | 4/1989 | Bolden ........................ 280/652 |
| 4,898,403 | A * | 2/1990 | Johnson ...................... 280/842 |
| 5,088,799 | A * | 2/1992 | Redmon et al. ........ 301/111.05 |
| 5,211,213 | A | 5/1993 | Hicks |
| 5,275,473 | A | 1/1994 | Hicks |
| 5,357,868 | A * | 10/1994 | Maas .......................... 105/180 |
| 5,478,140 | A | 12/1995 | Rasosky |
| 5,518,322 | A * | 5/1996 | Hicks .......................... 384/544 |
| 5,540,420 | A * | 7/1996 | Luzsicza .................. 267/141.1 |
| 5,599,056 | A * | 2/1997 | Schmitt ....................... 296/122 |
| 5,690,395 | A * | 11/1997 | Hicks ...................... 301/105.1 |
| 5,716,060 | A * | 2/1998 | Szendel .................. 280/11.223 |
| 5,775,819 | A * | 7/1998 | Kinney et al. .............. 384/544 |
| 5,853,227 | A | 12/1998 | Schmidt, III |
| 5,961,132 | A * | 10/1999 | Post ...................... 280/11.223 |
| 6,018,869 | A * | 2/2000 | Slankard et al. ....... 29/894.361 |
| 6,309,109 | B1 | 10/2001 | Chuang |

(Continued)

*Primary Examiner*—Christopher P. Ellis
*Assistant Examiner*—Kelly E Campbell
(74) *Attorney, Agent, or Firm*—Geoffrey A. Mantooth; L. Bruce Terry

(57) ABSTRACT

A wheel assembly for a material handling cart includes a wheel hub having first and second openings in first and second hub faces, each concentric with and extending along a central axis of the wheel hub. First and second ball bearings are located in the openings. Inner rings of the bearings are wider than the outer rings, and the inner rings contact one another. The outer rings are separated by, and are in contact with, a hub member. First and second bearing sleeves in the first and second openings contact and retain the bearings, and form first and second journal bearings. The sleeves contact journal surfaces on a portion of each inner ring that extends parallel to the central axis from an outer face of each outer ring away from a medial plane of the wheel assembly.

35 Claims, 11 Drawing Sheets

U.S. PATENT DOCUMENTS 6,367,885 B1 * 4/2002 Denner et al. ........... 301/105.1
6,398,395 B1 * 6/2002 Hyun ........................ 362/500
6,422,656 B1 * 7/2002 Denner et al. ........... 301/105.1
2002/0159661 A1 * 10/2002 Denner et al. .............. 384/276
2002/0171213 A1 * 11/2002 Kim ........................ 280/47.26
2003/0118259 A1 * 6/2003 Denner et al. .............. 384/416

* cited by examiner

US 7,011,317 B1

CART WHEEL WITH BEARING COMPONENTS

CROSS-REFERENCE TO RELATED APPLICATION

This is a continuation-in-part of application Ser. No. 10/233,178, filed Aug. 29, 2002, now abandoned, which is hereby incorporated herein by reference.

BACKGROUND OF THE INVENTION

1. Field of the Invention

The present invention relates generally to wheel assemblies for material handling equipment, such as carts, and more particularly to a wheel and hub assembly having a low maintenance ball bearing assembly in a hub of a wheel.

2. Description of the Prior Art

Wheels used on devices for material handling have requirements that are increasingly difficult to meet. For example, wheels used on shopping carts are expected to carry larger and larger loads as the large super stores proliferate. It is not uncommon for a shopping cart to be loaded with many cases of paper or canned goods, which can put a load of several hundred pounds on the wheels. Shopping cart wheels of a generation ago would not be capable of withstanding such loads.

In bakeries, wheels may be used on racks that are rolled into an oven while food is baked on the rack. Such wheels used in baking must withstand high temperatures, without melting or loosing lubrication.

In addition to withstanding vertical loads, cart wheels must withstand greater lateral loads, which may be placed on the wheel as a cart is pushed around a corner or along a surface that is not level.

Shopping cart wheels should also be designed for economical fabrication, since they are used in very large quantities. Furthermore, the wheel design should be able to withstand typical cleaning methods, such as a high pressure spray of washing detergent, because such cleaning can remove lubricants from wheel bearings, which may lead to noisy or poorly turning wheels.

Therefore, there is a need for an improved cart wheel that supports heavy loads; bears high lateral loads; requires little or no maintenance; protects a bearing from dirt, water, or other corrosive elements; and that rotates smoothly without wobbling.

SUMMARY OF THE INVENTION

It is an object of the present invention to provide an improved wheel and wheel bearing assembly for a material handling cart that is durable, requires less maintenance, is economical to manufacture, is easy to roll, and provides superior vertical and lateral support for heavy loads.

According to one embodiment of the invention, a wheel assembly for a material handling cart includes a wheel hub having first and second openings in first and second hub faces, each concentric with and extending along a central axis of the wheel hub. First and second ball bearings are located in the openings. Inner rings of the bearings are wider than the outer rings, and the inner rings contact one another. The outer rings are separated by, and are in contact with, a hub member or gusset. First and second bearing sleeves in the first and second openings contact and retain the ball bearings, and form first and second journal bearings. The sleeves contact journal surfaces on a portion of each inner ring that extends parallel to the central axis from an outer face of each outer ring, away from a medial plane of the wheel assembly. The sleeves retain and protect the ball bearings. The ball bearings are preferably precision, self-contained ball bearing units. The wheel assembly may include a thread guard extends radially from the first inner ring and toward the medial plane of the wheel hub to points inside the plane of the hub face. The ball bearing and bearing sleeve are press fit into the opening.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

Figure 1:
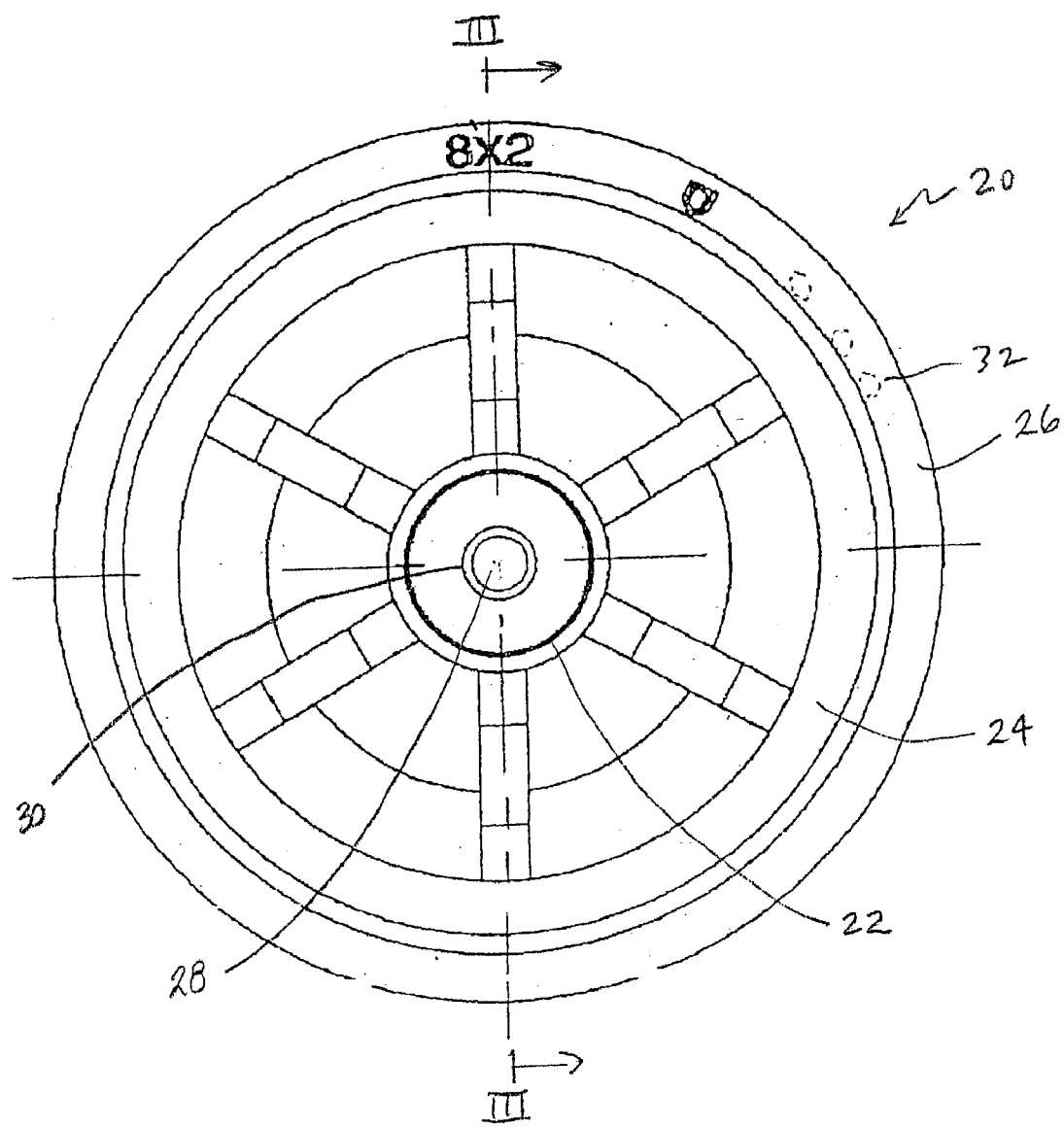
FIG. 1 is a side elevational view of a wheel having a hub assembly in accordance with an embodiment of the present invention.

With reference now to the drawings, and in particular with reference to FIG. 1, there is a depicted a side elevational view of a wheel assembly having a bearing assembly in accordance with an embodiment of the present invention. As shown, wheel assembly 20 includes bearing assembly 22 surrounded by hub 24. Tread 26 may be located about the circumference of hub 24. In the center of wheel assembly 20, axle opening 28 is adapted to receive an axle (not shown). An opening in spanner bushing 30 defines axle opening 28.

According to one aspect of the present invention, bearing assembly 22 supports vertical and lateral loads which may be placed on the wheel by an axle installed in axle opening 28 of spanner bushing 30. Additionally, bearing assembly 22 holds a lubricant in contact with a bearing and spanner bushing 30, and protects the bearing and spanner bushing 30 from water, detergent, dirt, and other elements that may wear, corrode, or rust the components of bearing assembly 22.

Figure 2:
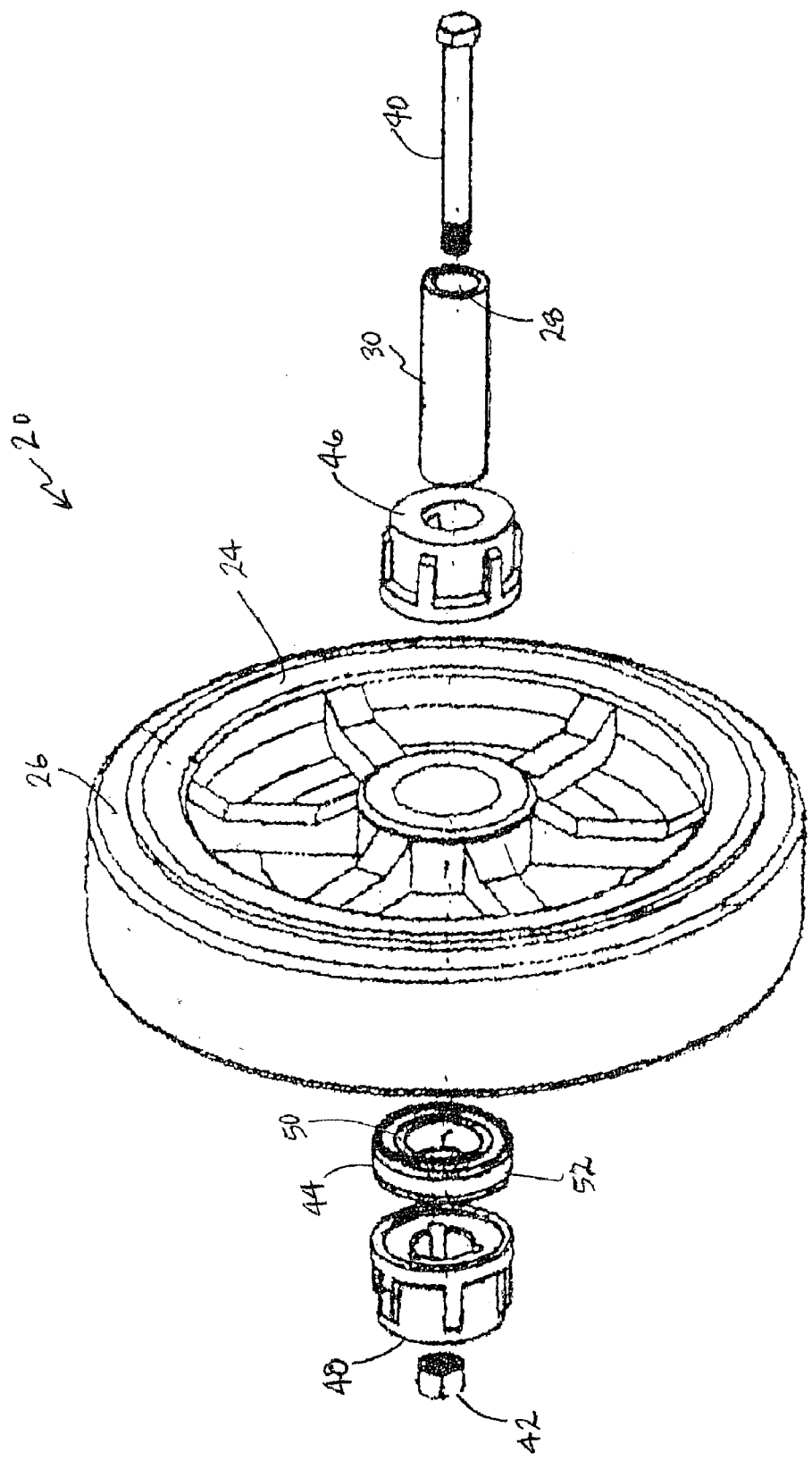
FIG. 2 is an exploded view of a wheel having a hub assembly in accordance with an embodiment of the present invention.

Referring now to FIG. 2, there is depicted an exploded view of wheel assembly 20 in accordance with the present invention. As shown, hub 24 has tread 26 mounted around its outer rim. The components of bearing assembly 22, which are assembled in the center of hub 24 while it is being fabricated, are shown in an exploded view for a clearer understanding of the relationship of the various components. As illustrated, spanner bushing 30 is tube-like, and includes axle opening 28 for receiving axle 40. Axle 40 is held in place by nut 42.

Bearing assembly 22 includes bearing 44, bushings 46, and spanner bushing 30. Bearing 44 may be a conventional ball bearing, having inner race 50 and outer race 52. Inner race 50 and outer race 52 provide surfaces for contacting ball bearings 62 and for holding the ball bearings between the two races. (See also FIG. 3, which is a sectional view of wheel assembly 20 taken along line III—III in FIG. 1.) A race is typically a rounded or radiused groove in which the balls roll. The race is machined into the outer surface of an inside ring and into the inside surface of an outside ring.

In a preferred embodiment, bearing 44 may be implemented with a precision, high-tolerance, sealed ball bearing that is conventional and commercially available. High-tolerance ball bearings may be used to reduce or eliminate wheel wobble, to provide smooth, easy rotation, and to carry heavy loads.

When bearing assembly 22 is assembled, inner race 50 surrounds and contacts the cylindrical outer surface of spanner bushing 30. As wheel assembly 20 rotates and bears a load, inner race 50 will likely remain stationary with respect to spanner bushing 30, while outer race 52 rotates with, and is stationary with respect to, bushings 46 and hub 24.

Bushings 46 also surround and contact the cylindrical outer surface of spanner bushing 30. As wheel assembly 20 rotates, bushings 46 rotate around, and are in sliding contact with, the cylindrical outer surface of spanner bushing 30.

Bushings 46 protect bearing 44 from elements that may corrode or impair the operation of bearing 44, and bushings 46 assist in maintaining the position of bearing 44 and spanner bushing 30 as the bushings contact and constrain spanner bushing 30. Moreover, bushings 46 also provide lateral support to bearing 44, and bear some vertical load transferred from axle 40 through spanner bushing 30. Bushings 46 also contain lubricant for the smooth operation of bearing 44, and for lubricating the interface between bushings 46 and spanner bushing 30. Thus, bushings 46 position parts, protect parts, lubricate parts, and assist in bearing the load of the wheel assembly.

Figure 3:
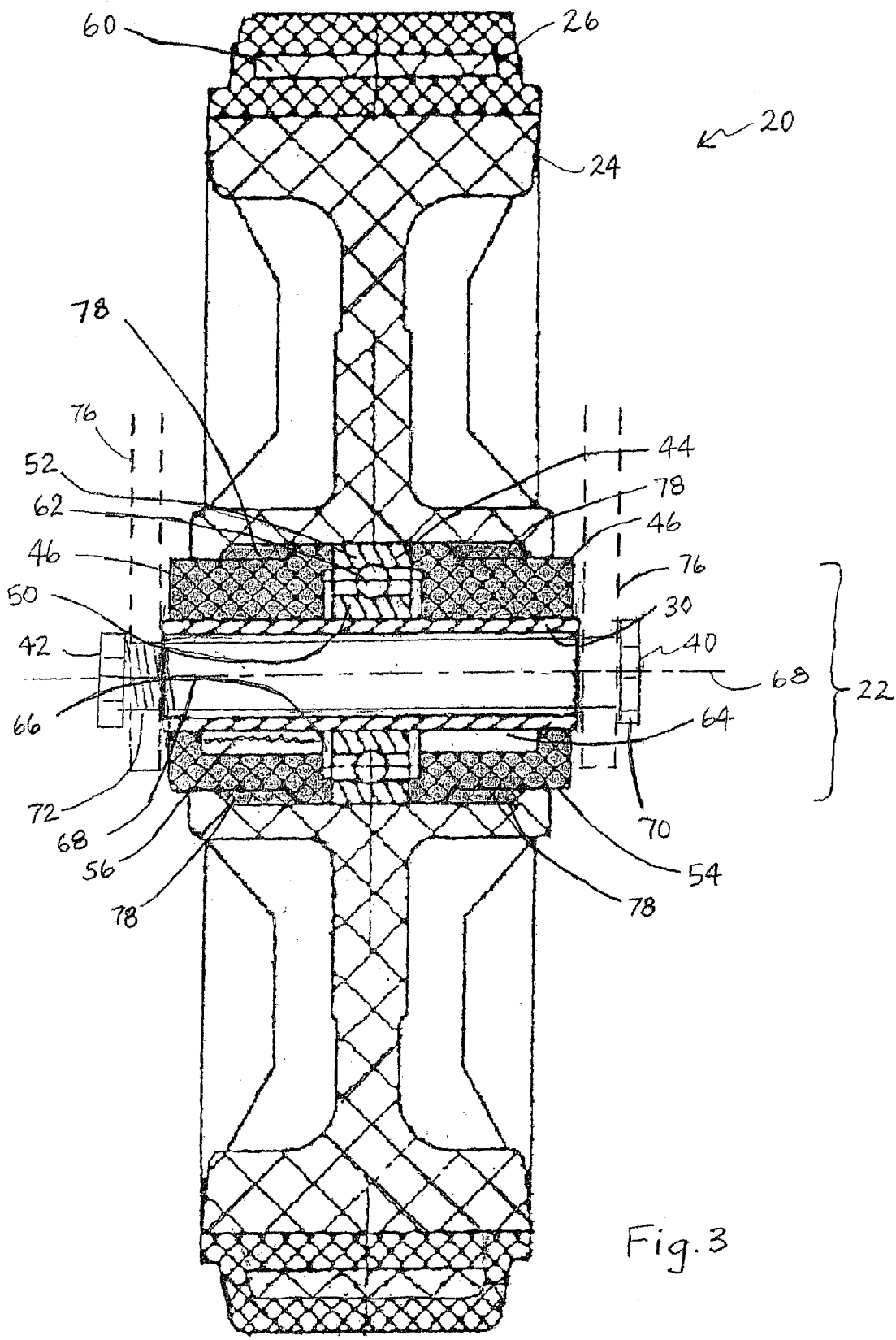
FIG. 3 is a sectional view of a wheel having a hub assembly in accordance with an embodiment of the present invention taken along a line III–III in FIG. 1.

As shown in FIG. 3, bushings 46 are adjacent to, and on either side of, bearing 44. Bushings 46 are preferably generally cylindrically shaped, having a diameter approximately equal to the outer diameter of bearing 44. Bushings 46 are preferably made from polyoxymethylene (POM), or other acetyl plastic material, or other low-friction material.

Figure 5:
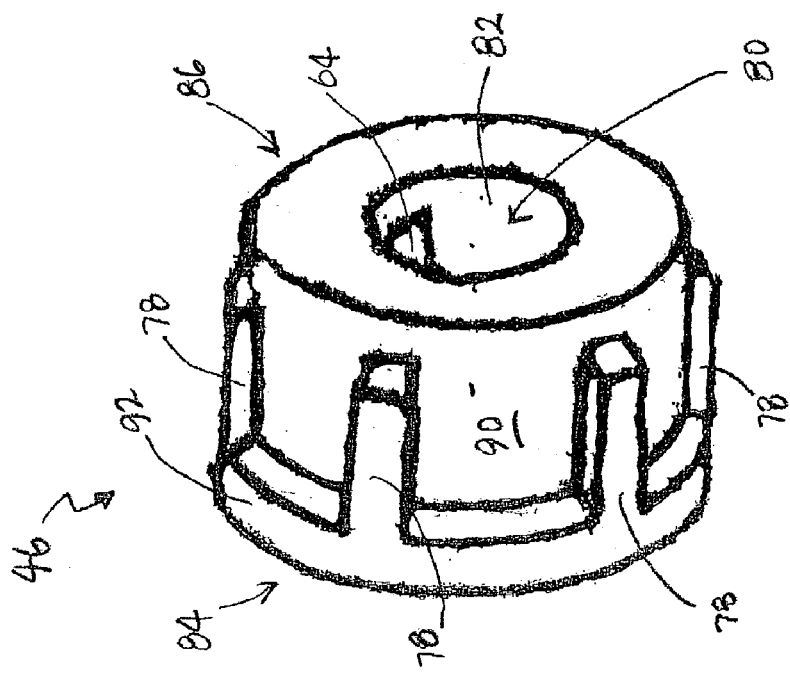
FIGS. 4 and 5 show, respectively, an inside and outside perspective view of a bushing according to an embodiment of the present invention.
Figure 4:
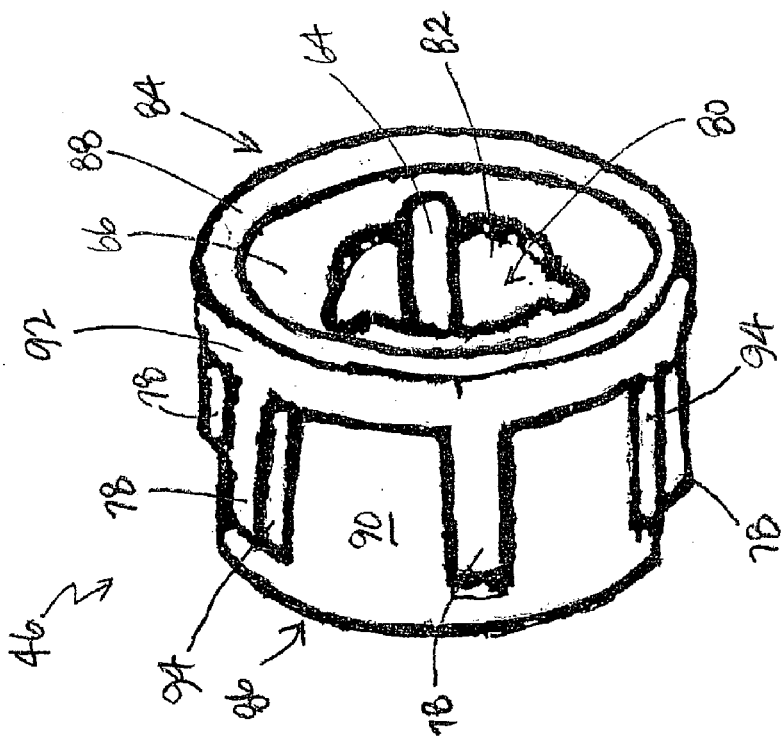

FIGS. 4 and 5 show an inside and outside perspective view, respectively, of bushing 46 according to the present invention. As shown, bushing 46 is generally cylindrical, having cylindrical opening 80 that passes all the way through bushing 46 for receiving spanner bushing 30. Opening 80 is defined by inner surface 82, which is designed to surround and contact the cylindrical outer surface of spanner bushing 30. Spanner bushing 30 fits tightly into opening 80, with little or no play, but not tight enough to prevent spanner bushing 30 from smoothly rotating in opening 80.

Bushings 46 have an inner face 84 and an outer face 86. When the wheel is assembled on a cart, inner face 84 is adjacent to bearing 44, and outer face 86 is adjacent to yoke 76 (See FIG. 3). Outer face 86 is generally round and flat. Outer face 86 can contact yoke 76, with little or no lubrication needed. Outer face 86 may be flush with the material of hub 24, or may extend outward, as shown at bushing extension 54.

According to an aspect of the present invention, bushings 46 have a non-cylindrical outer surface contour that engages hub 24 in a manner that prevents bushings 46 from moving with respect to hub 24, so that the bushing and the wheel move in unison with respect to each other. Therefore, when hub 24 is assembled, bushings 46 are restricted from moving relative to hub 24 by the features, shapes, or contours of the outer surface of the bushing. Such contours may be ridges, detents, indentations, lobes, fins, fingers, flanges, flutes, splines, projections, and the like.

In the embodiment shown in greater detail in FIGS. 4 and 5, outer surface 90 of bushings 46 is not cylindrical in that it has ridges 78 or other contours designed to engage or interlock with hub 24 in the area surrounding bearing assembly 22. As may be seen in FIG. 3, ridges 78 extend radially outward from the generally cylindrical outer surface 90 of bushings 46 so that they extend into the body of hub 24. This structure may be made by an injection molding process that injects a plastic material of hub 24 into a mold that surrounds bearing assembly 22. By this manufacturing method, ridges 78 are surrounded by injection molded plastic.

The purpose of ridges 78 is to secure bushing 46 to hub 24 so that the bushing and the wheel move in unison with respect to each other. In a preferred embodiment, ridges 78 begin near inner face 84 and run parallel to central axis 68 (See FIG. 3), along outer surface 90 toward outer face 86, ending before outer face 86. Ridge faces 94 on the sides of the length of ridges 78 are perpendicular to outer surface 90 to provide structure that engages hub 24 to prevent relative movement between bushings 46 and hub 24.

In addition to ridges 78, bushings 46 may be prevented from moving axially outward by circumferential lip 92, which runs around the inner edge of outer surface 90. As shown in FIGS. 2–5, ridges 78 extend from lip 92 toward outer face 86. Because the smallest diameter of bushings 46 is not toward inner face 84, bushings 46 cannot be removed from hub 24 without breaking or damaging the central portion of hub 24. This design holds bushings 46 captive in the material of hub 24.

In order to provide low maintenance and smooth rotation, a lubricant is stored within hub assembly 22. In a preferred embodiment shown in FIGS. 3–5, bushings 46 include one or more grooves or lubricant cavities 64 for storing and distributing lubricant 56 over the cylindrical outer surface of spanner bushing 30. Lubricant cavities 64 are located in inner surface 82 of bushing 46, and open to lubricant recess 66. Lubricant distributed on the cylindrical outer surface of spanner bushing 30 lubricates the interface between spanner bushing 30 and inner surface 82 of bushings 46, which contacts spanner bushing 30.

Additional lubricant may be stored and distributed from lubricant recess 66, which, in a preferred embodiment, is located adjacent to inner race 50 and ball bearings 62, as shown in FIGS. 3 and 4. While lubricant cavities 64 and lubricant recess 66 may or may not be connected, in a preferred embodiment, lubricant cavity 64 and lubricant recess 66 are connected, which simplifies adding lubricant during assembly and enables lubricant stored in either location to be mixed and flow to where it is needed. While lubricant cavities 64 may be open to lubricant recess 66, they are not open to outer face 86. Lubricant recess 66 also permits inner race 50 to rotate without contacting or rubbing bushings 46.

When wheel assembly 20 is in use, axle 40 is inserted into axle opening 28 in spanner bushing 30. Axle 40 may be implemented with a bolt having head 70 at one end and threads 72 at the other end. Head 70 and nut 42 couple shopping cart yoke 74 and 76 to wheel assembly 20.

In operation, axle 40, nut 42, and spanner bushing 30 all remain fixed relative to yoke 76.

Inner face 84 includes outer rim 88, which is designed to contact outer race 52 of bearing 44 and contain lubricant within lubricant recess 66. Thus, bushing 46 and outer race 52 remain fixed relative to each other, while inner race 50 rotates about central axis 68 (See FIG. 3).

Wheel assembly 20 shown in FIGS. 1–5 is preferably made by an injection molding process that generally injects material around bearing assembly 22, and then uses a second injection molding process to add tread 26 to hub 24.

The manufacturing process may start with inserting a bushing-bearing-bushing assembly 46, 44, 46 (i.e., bearing assembly 22) into one side of a half-mold of hub 24, wherein the mold of hub 24 is split into two parts by a plane perpendicular to central axis 68. Alternatively, a bushing-bearing 46, 44 may be inserted into one side of the mold, and a second bushing 46 is inserted into the other side, so that when the sides of the mold come together, the bushing-bearing-bushing assembly 46, 44, 46 comes together.

After inserting bushings 46 and bearing 44 into the half-mold, the mold is closed, forming a mold cavity. Then plastic, such as polypropylene, is injected into the mold cavity. While plastic is being injected, bushings 46 are pressed against bearing 44 to prevent plastic from intruding into bearing 44. Specifically, outer rim 88 of inner face 84 of bushings 46 form a seal with outer race 52 to prevent plastic intrusion. (See FIG. 3) Pressure of the injected plastic against lip 92 helps secure this seal by forcing bushings 46 against bearing 44.

After a period for solidifying, opening the half-molds, and removing the wheel, the hot wheel may be submerged in a cooling fluid, such as chilled water, to speed cooling. Before submerging in cooling fluid, openings 80 in bushings 46 may be plugged to prevent the fluid from contacting bearing 44.

Once the wheel has cooled enough, the wheel may be inserted into another mold for forming tread 26 about the outer circumference of wheel 24. Tread 26 is preferably a more pliable plastic than the plastic used for hub 24. As may be seen in FIG. 3, the material of tread 26 may integrally formed with hub 24, wherein tread material passes through openings or holes near the outer circumference of hub 24. Examples of such holes are shown with broken lines, indicating a hidden feature, at holes 32 in FIG. 1. In FIG. 3, it is clear that the material of hub 24 extends radially outward into the tread material, where outer hub edge 60 is shown.

After molding tread 26 onto hub 24, lubricant is put into lubricant cavities 64 and lubricant recess 66. Finally, spanner bushing 30 is inserted into opening 80, and wheel assembly 20 is ready to be installed on a cart using axle 40 and nut 42.

By molding bushings 46 in conjunction with bearing 44 into the hub, the bushings serve as lateral extensions of the bearing outer race, distributing the load and minimizing wobble.

In other embodiments of the present invention, the hub is molded with only bearing 44, while bushings are inserted after molding. This allows the use of plastics with differing thermal characteristics to be used in the hub and the bushings. The bushings may be designed with a smallest diameter located near inner face 84 so that the bushings may be inserted or pressed into place adjacent to the bearing after the wheel has been formed. For example, the embodiment of wheel assembly 100 shown in FIGS. 6 and 7 includes hub 102 and bearing assembly 104. Hub 102 is molded so as to encompass the outer race of bearing 44. This fixes the bearing inside of the hub.

Bearing assembly 104 includes spanner bushing 30, bearing 44, and bushings 106. Similar to the embodiment shown in FIGS. 1–5, spanner bushing 30 has a central axis 68, and axle opening 28 along central axis 68 through bushing 30. Bearing 44 is also similar to that previously described.

Bushings 106 are similar to the previous embodiment in that they are adjacent to bearing 44, and contact and surround the cylindrical outer surface of spanner bushing 30 to protect, support, and hold lubricant next to bearing 44 and spanner bushing 30.

However, bushings 106 are different from the previous embodiment because the smallest diameter of bushings 106 is toward inner face 108, adjacent to bearing 44. This wheel design may be assembled by press fitting bushings 106 into wheel 102 adjacent to bearing 44, which was previously molded into wheel 102. Axial ridges 114 along the non-cylindrical outer surface of bushings 106 may still be used to ensure a strong press fit that will hold bushings 106 fixed in relation to wheel 102 so that the bushing will not move along central axis 68, and will not rotate about central axis 68 relative to wheel 102. The ridges are triangular in transverse cross-section to assist in the press-fit insertion. In addition, bushings 106 have outer lips 116 and outer faces 118 for contacting yoke 76.

Figure 6:
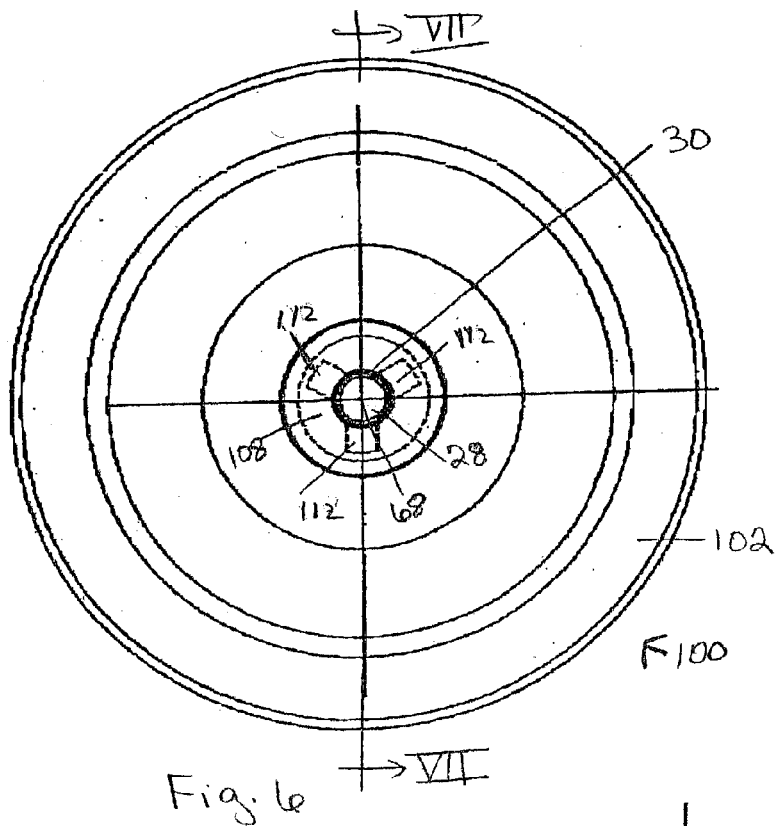
FIG. 6 is a side elevational view of an alternate embodiment of a wheel having a hub assembly in accordance with an embodiment of the present invention.
Figure 7:
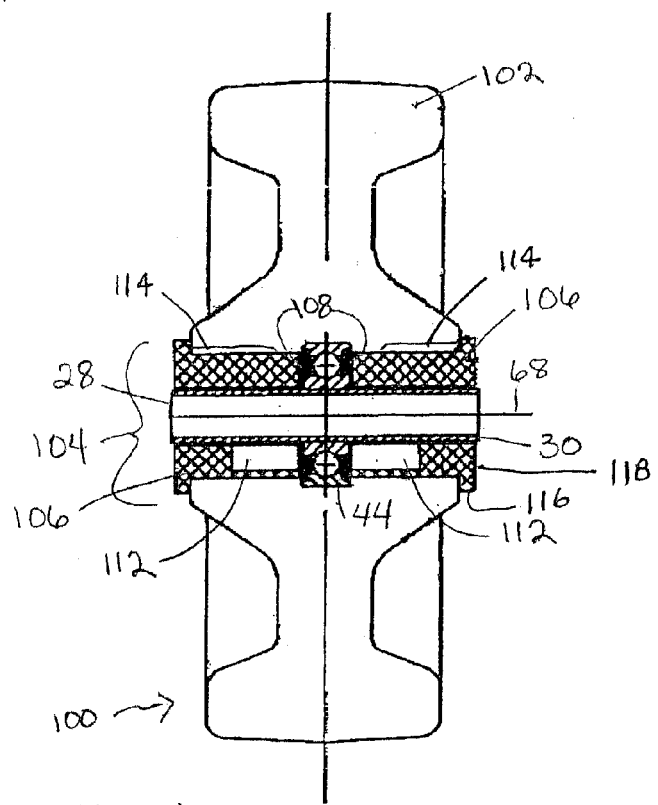
FIG. 7 is a front sectional view of an alternate embodiment of a wheel having a hub assembly in accordance with an embodiment of the present invention taken along a line VII–VII in FIG. 6.

In FIGS. 6 and 7, lubricant cavities 112 may be seen adjacent to, and open to, spanner bushing 30 and bearing 44. Lubricant cavities 110 hold and distribute lubricant to spanner bushing 30 and bearing 44. Although not shown in FIGS. 6 and 7, bushings 106 may include a lubricant recess and a lubricant cavity in a connected configuration similar to that described above. In the present invention, it is important that either lubricant cavities or lubricant recesses distribute lubricant to the cylindrical outer surface of spanner bushing 30 and to parts of bushing 44, such as inner race 50 and ball bearings 62.

If wheel assembly 100 is used in a high temperature environment, such as on a food handling cart that may be rolled into an oven for baking food items or heat treating other manufactured goods, wheel 102 may not include a tread or tire, and the lubricant used in lubricant cavities or recesses must be able to withstand the temperature without loosing the ability to lubricate or leaking from bearing assembly 104. A lubricant with a wide temperature range, such as a range between −58° F. and 392° F., can be used in this application.

Other embodiments of the present invention are shown in FIGS. 10 through 14. These embodiments do not use a spanner bushing, and may include two pairs of precision bearings, one on each side of a medial plane of the wheel. The bearings on each side of the wheel may each include a journal or sleeve bearing in conjunction with a precision ball bearing or rolling element bearing. Having a bearing on each side of the wheel increases lateral stability, which makes the wheel able to support loads at the tread that are parallel to the axis of the wheel. Having a journal bearing side-by-side with each ball bearing further increases the lateral stability.

A journal bearing consists of a cylindrical housing or sleeve supporting a rotating shaft. The term "journal" refers to the portion of a shaft contained within a bearing. In this embodiment, the journal is a portion of the inner ring located adjacent to a face of the outer ring of the ball bearing.

Figure 11:
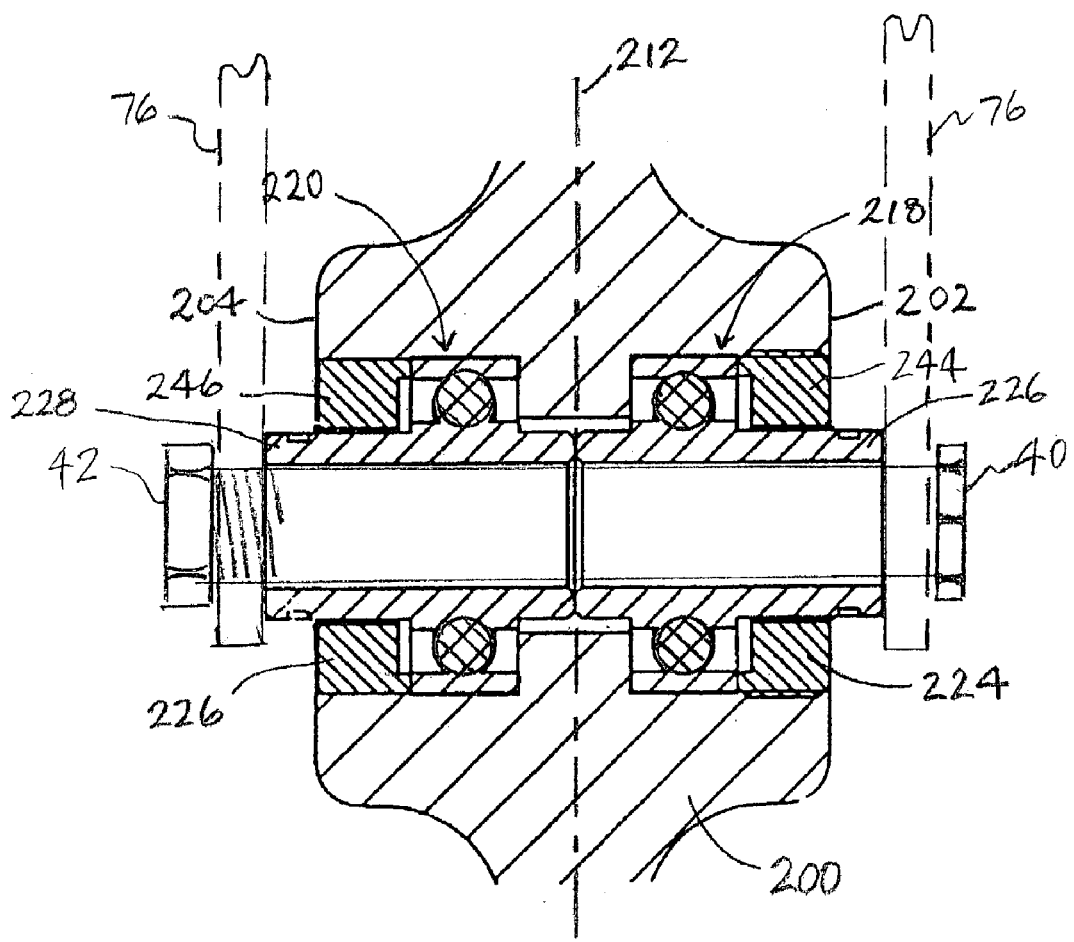
FIG. 11 is a detailed sectional view of the hub assembly of FIG. 10.

FIG. 11 shows a section view of wheel hub 200 along a line similar to line III—III in FIG. 1, which view is perpendicular to a medial plane of the wheel as illustrated by line 212. First and second ball bearings 218 and 220 are shown installed in a finished wheel on opposite sides of medial plane 212. Beside and to the outside of each ball bearing 218 and 220 are sleeves 224 and 226 that form journal bearings.

The wheel of FIG. 11 is mounted to a cart by axle 40 and nut 42. Axle 40 passes through holes in yoke 76. Axle 40, nut 42, and inner rings 226 and 228 remain stationary with respect to yoke 76 because inner rings 226 and 228 are compressed together, and compressed against yoke 76. In a wheel approximately 5 inches in diameter, the inside faces of ball bearings 218 and 220 are preferably spaced ⅝ inch apart, centered about medial plane 212. In wheels with larger diameters, the distance between the bearings may increase, with the ball bearings tending toward the outer face of the hub for greater stability. More detail regarding the inner rings, and other individual components of the wheel hub and its assembly may be seen in FIG. 10, which shows an assembled view of the wheel hub on the right side of the figure, and an exploded view on the left.

Figure 10:
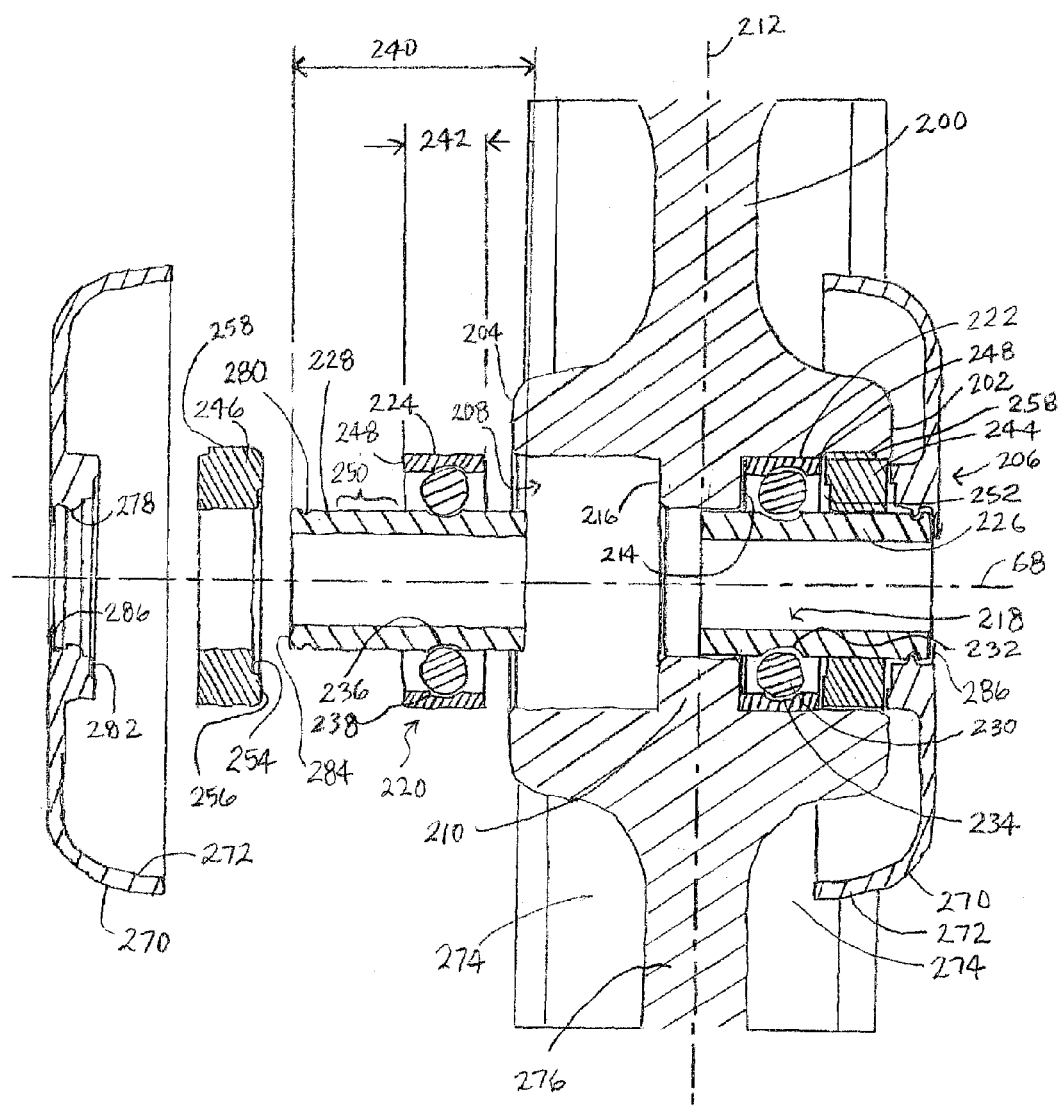
FIG. 10 is a sectional, partially exploded view of a hub assembly in accordance with still another embodiment of the present invention.

As illustrated in FIG. 10, wheel hub 200 includes opposing hub faces—first hub face 202 and second hub face 204—with openings for bearings therein, such as first opening 206 and second opening 208, respectively. Openings 206 and 208 extend from hub faces 202 and 204 toward medial plane 212 along central axis 68. As openings extend inward, the diameter of each opening may be reduced, forming a ridge, or gusset, or hub member 210, having first and second faces 214 and 216, which provide further stabilization of the ball bearings and containment of the lubricant in the roller bearings. Gusset or hub member 210 helps wheel hub 200 bear side or lateral loads, including side impact loads, that tend to move one of the ball bearings along central axis 68.

Figure 12:
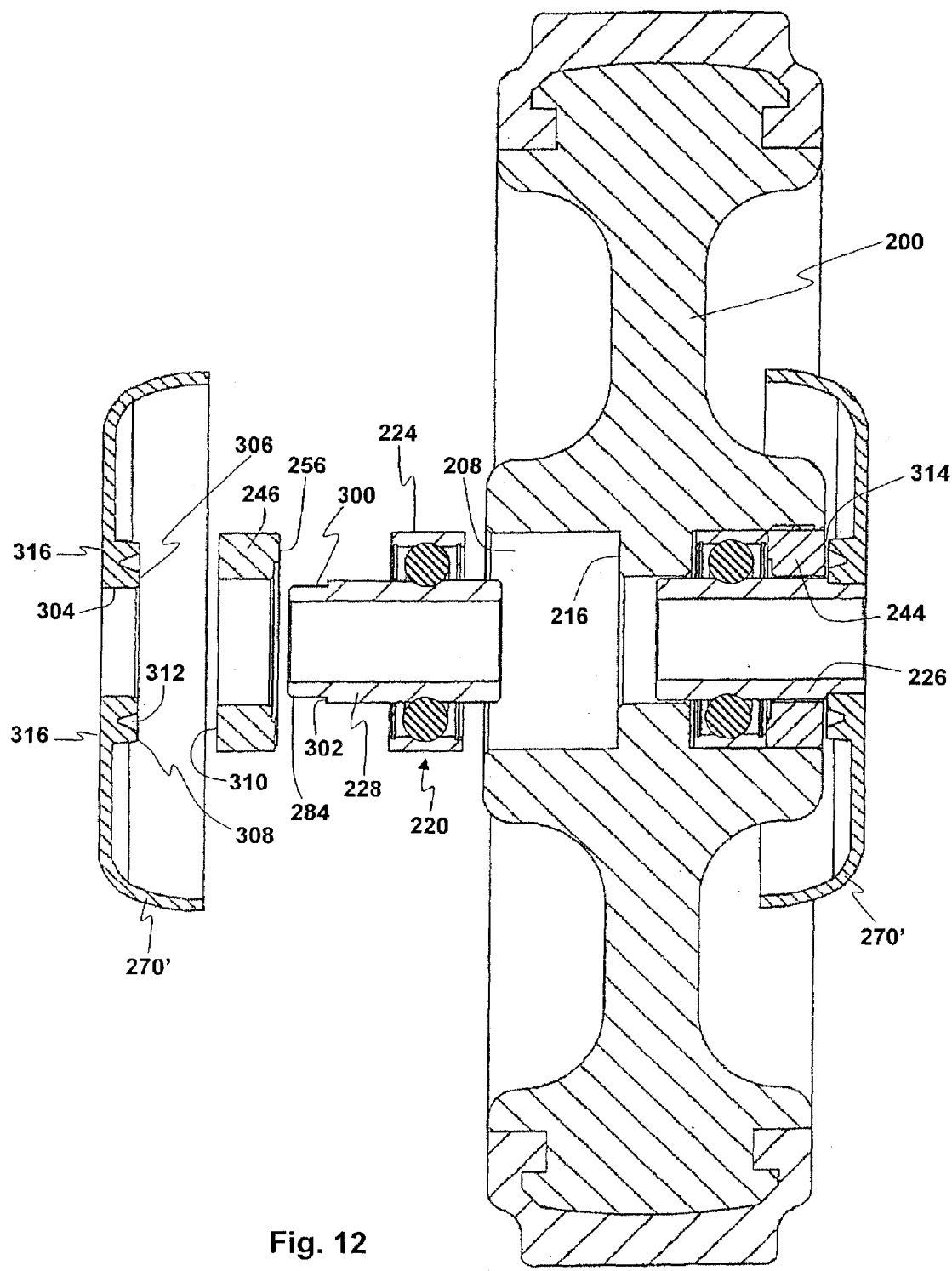
FIG. 12 is a sectional, partially exploded view of a hub assembly in accordance with yet another embodiment of the present invention.

In FIGS. 10–12, openings 208 are cylindrical. In the alternative embodiments shown in FIGS. 13 and 14, openings 206' and 208' have a non-cylindrical shape, in at least a portion of the opening, for engaging components inserted into openings 206' and 208' so that the inserted components rotate with hub 200'.

On the right side of FIG. 10, ball bearing 218 is shown in its press-fit location in opening 206, while ball bearing 220 on the left is shown prior to installation. Ball bearings 218 and 220, which are substantially similar to each other, include first and second outer rings 222 and 224, first and second inner rings 226 and 228, and balls 230 that roll in between first inner and outer races 232 and 234, and second inner and outer races 236 and 238. In a preferred embodiment, bearings 218 and 220 are ball bearings, but other rolling element bearings may be used.

Ball bearings 218 and 220 have wide inner rings, wherein the widths 240 of inner rings 226 and 228 are larger than the widths 242 of outer rings 222 and 224. A bearing with a wide inner ring may also be called a bearing with an integral shaft. When installed, inner rings 226 and 228 are located between the opposing hub faces, first hub face 202 and second hub face 204. Inner rings 226 and 228 preferably extend past the plane of hub faces 202 and 204. In a preferred embodiment, ball bearings 218, 220 are sealed precision bearings with integral shafts, similar to a series of precision bearings known as "series 608ZZ" bearings. Ball bearings 218 and 220 are preferably self-contained, precision ball bearing units. As may be seen in FIG. 11, the compressive force applied by nut 42 and axle 40 presses inner rings 226 and 228 together. Thus inner rings 226 and 228 extend past gusset 210 to a point where they meet, which is preferably at medial plane 212.

First and second sleeves 244 and 246 help bear the vertical and lateral loads on the wheel, and also serve to retain the bearings within the hub. They are installed adjacent to an outer face 248 of first and second outer rings 222 and 224. First and second sleeves 244 and 246 serve as journal bearings, sliding on journal surfaces 250, which are located on an outer perimeter of first and second inner rings 226 and 228. Journal surfaces 250 are the surfaces contacted by first and second sleeves 244 and 246. Journal surfaces 250 are located on outer portions of first and second inner rings 226 and 228 that extend parallel to central axis 68 from outer faces 248 of first and second outer rings 222 and 224.

First and second sleeves 244 and 246 also help to keep lubrication on ball bearings 218 and 220 at the outer faces of the bearings by holding lubricant in lubricant recesses 252 and 254, which are located on inner faces 256 of the sleeves. Lubricant recesses 252 and 254 may be grooves that may extend radially from the inner diameter of the sleeve up to a radius substantially equal to the radius of the inner surface of outer ring 222 or 224, thereby locating the recess where lubricant is needed, adjacent to the gap between the inner 226 and 228 and outer 222 and 224 rings of bearings 218 and 220. Lubricant recesses 252, 254 may also serve a heat reduction function.

First and second sleeves 244 and 246 are preferably made of Delrin® acetal resin, or other lightweight, durable, low-wear, low-friction plastic that can be used in a self lubricating plastic bearing. The sleeves are preferably press fit into openings 206 and 208, and are additionally held in place within the openings by ribs 258, which are raised at intervals around the outer perimeter surface of the sleeves.

Figure 13:
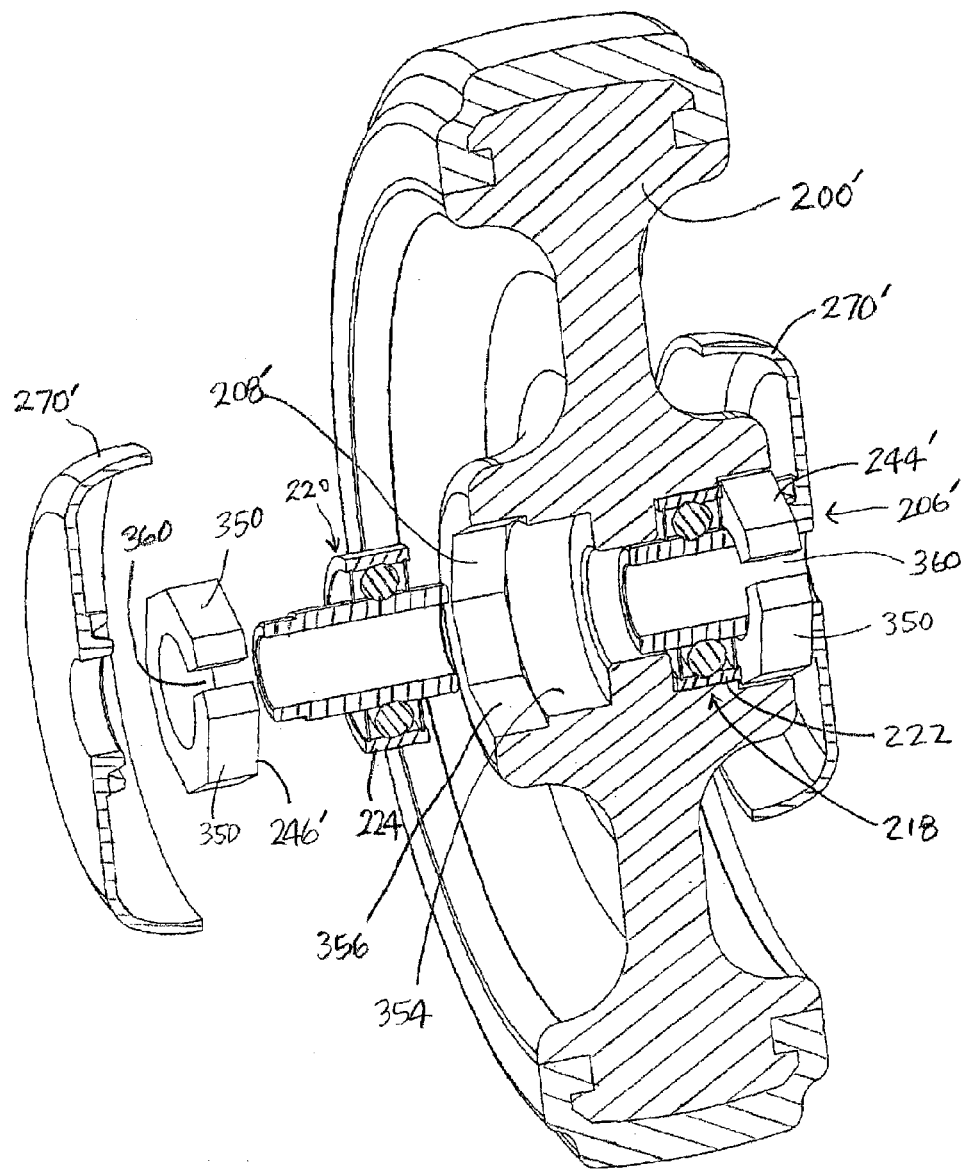
FIG. 13 is a sectional, partially exploded view of a hub assembly in accordance with an alternative sleeve having a non-cylindrical outer surface in the hub assembly of FIG. 10.
Figure 14:
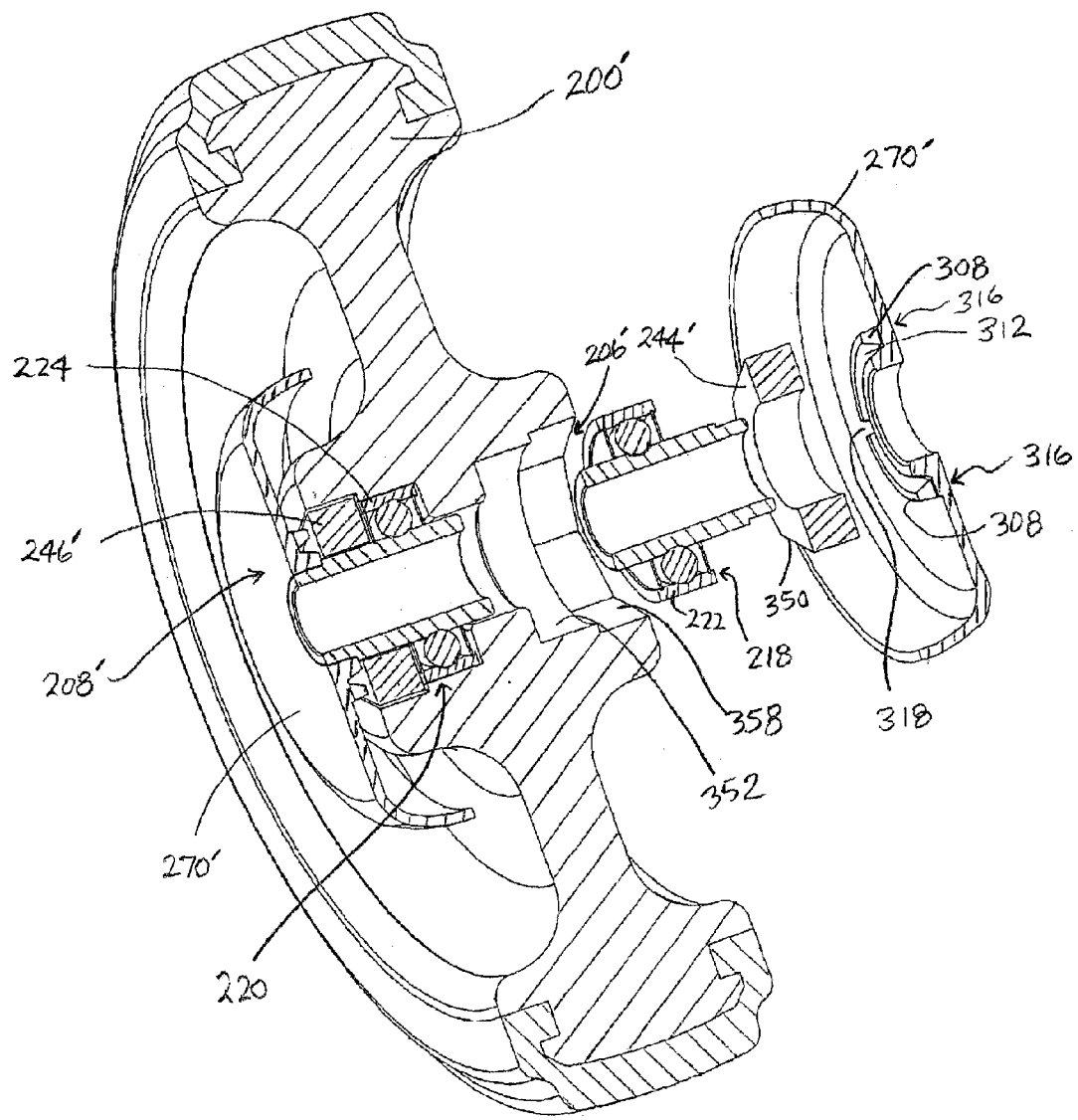
FIG. 14 is an alternative view of the embodiment shown in FIG. 13.

In alternative embodiments of the present invention, the outer surface of first and second sleeves 244, 246 may have a non-cylindrical shape. Examples of such non-cylindrically-shaped sleeves are shown in FIGS. 13 and 14, wherein sleeves 244' and 246' have an octagonal outer surface, which includes flat faces 350 surrounding the outer perimeter of sleeves 244' and 246'. Openings 206' and 208' also have non-cylindrical portions that conform to the shape of the outer surface of sleeves 244' and 246'. In the examples shown in FIGS. 13 and 14, openings 206' and 208' have a cylindrical portion for conforming to outer rings 222 and 224 of ball bearings 218 and 220. These cylindrical surfaces are shown at reference numeral 352 in FIG. 14 and 254 in FIG. 13. The non-cylindrical portions of openings 206' and 208' are shown at reference numerals 356 in FIG. 13 and 358 in FIG. 14. In this example, the non-cylindrical portion of openings 206' and 208' is octagonally shaped to match the octagonal outer shape of sleeves 244' and 246'. Other non-cylindrical shapes may be used, such as ribs, ridges, or triangular points, or shapes having a different number of flat faces.

In addition to a non-cylindrical outer surface, sleeves 244' and 246' may also include slots 360, which allow sleeves 244' and 246' to constrict or become smaller in diameter around journal surfaces 250, so that the journal surface is squeezed. To more clearly show slot 360, sleeves 244' and 246' in FIG. 13 are shown as a complete part, and not in a sectional view as they are in FIG. 14. By constricting around journal surface 250, a measured amount of friction is created in the journal bearing, which is useful in preventing a cart from moving in response to a very small force, such as that produced by a moderate wind in a parking lot. Thus, when it is useful or desirable to have some friction that resists the turning of hub 200', this friction may be introduced with slotted sleeves, such as sleeves 244' and 246', wherein the slots allows the inner diameter of the sleeve to be reduced as part as it is press fitted into an opening in the hub face.

A thread guard 270 may be located over each hub face 202 and 204 for preventing threads, strings, dust, or the like from becoming wrapped around the axle of the wheel (axle not shown in FIG. 10), or from contaminating the journal bearing or ball bearing. Thread guard 270 has an outer rim 272 that is curved inward into cavity 274, which is a concave recess formed in wheel disk 276. Because thread guard 270 curves into cavity 274 and covers the portion of inner ring 226, 228 that extends beyond hub face 202, 204, threads or other string-like materials that fall from the tread will not land on and be wound around inner ring 226, 228.

When installed, thread guard 270 may be snapped onto inner ring 226, 228, where it is held in place by detent 278 on the inside of the hub of thread guard 270 as it is snapped into thread guard groove 280 located at the distal end 284 of inner ring 226, 228. Because inner rings 226, 228 remain stationary with respect to yoke 76, thread guard 270 also remains stationary with respect to yoke 76, so it does not rub on the yoke as hub 200 rotates.

A lubricant recess 282 may also be located in the inner hub of thread guard 270 for holding lubricant near the journal bearing, which comprises sleeve 244, 246 and journal surface 250. Thread guard 270 may also include lip 286 for covering inner ring 226, 228 so that water, dirt, or other contaminants are kept out of the journal bearing.

The wheel hub assembly shown in FIGS. 10 and 11 is preferably assembled by inserting ball bearings 218 and 220 into openings 206 and 208, so that outer rings 222 and 224 are press fitted into the openings, and seated against first and second ridges 214 and 216, respectively. First and second ridges 214 and 216 are opposite faces of hub member 210, which may also be called a ridge, gusset, or a stop shoulder, since it locates or stops the bearing as it is inserted into the opening.

After inserting the ball bearings, sleeves 244 and 246 are press fitted into openings 206, 208. Ribs 258 increase the friction in the press fit between sleeves 244, 246 and openings 206, 208. Sleeves 244, 246 are slid onto inner rings 226, 228 and pressed up to outer face 248 of outer rings 222, 224, which provides added support for ball bearings 218, 220. A lubricant may be added to lubricant recesses 252 and 254 before the sleeves are inserted. Finally, thread guards 270 are snapped into thread guard grooves 280.

With reference now to FIGS. 12–14, there is depicted yet another embodiment of the present invention. The embodiment of FIGS. 12–14 is similar to the embodiment shown in FIGS. 10 and 11, with the difference being in the design of thread guard 270'. Thread guard 270' is designed to facilitate the assembly of wheel hub 200 and to maintain a clearance between thread guard 270' and first and second sleeves 244, 246 (and similarly 244', 246' in FIGS. 13 and 14). The clearance keeps sleeves 244, 246 from rubbing on thread guard 270' as sleeves 244, 246 rotate while thread guard 270' remains stationary with respect to yokes 76.

As illustrated in FIG. 12, inner rings 226, 228 include step 300, which is a reduced diameter portion of the inner ring at distal ends 284. Step 300 forms stop 302, which limits the position of thread guard 270' as inner surface 304 slides onto step 300, and inner face 306 eventually comes into contact with stop 302. Stop 302 prevents inner face 306 from touching sleeve outer face 310.

Other important features of thread guard 270' are ridge 308 and V-groove 312. V-groove 312 allows thread guard 270' to bend, flex, or deform during installation when pressure is applied at locations 316 on the outer face of thread guard 270'. Ridge 308 is a circular ridge designed to contact sleeve outer face 310 during the assembly of wheel hub 200, and designed to reform or retract, leaving clearance 314 after the hub is assembled.

Ridge 308 and V-groove 312 may be more clearly seen in FIG. 14. Also shown in FIG. 14 is slot 318, which is a radial slot in ridge 308. Slot 318, which allows thread guard 270 to be deformed in a cone-like manner as force is applied to points 316 during the press fitting step in the manufacturing of hub assembly 200'.

When assembling wheel hub 200 of the embodiment shown in FIG. 12, ball bearing 220, sleeve 246, and thread guard 270' may all be preassembled before they are pressed into opening 208. This preassembly is done by placing sleeve 246 onto inner ring 228, and then placing thread guard 270' onto the stepped portion 300 of inner ring 228.

Once preassembled, the bearing, sleeve, thread guard assembly may be pressed into opening 208 by applying pressure on the outside of thread guard 270', opposite ridge 308, on a circular surface indicated by points 316. As force is applied, outer ring 224 stops against ridge 216, inner face 256 of sleeve 246 stops against outer ring 224, and inner face 306 stops against stop 302. As pressure is applied at circular surface 316, thread guard 270' deforms or bends, and ridge 308 extends past stop 302, and remains in contact with sleeve outer surface 310, thereby forcing inner face 256 against outer ring 224.

When force is removed from circular surface 316, thread guard 270' reforms or returns to its original shape, and ridge 308 retracts from sleeve outer face 310 leaving clearance 314. The V-groove 312 facilitates the small amount of cone-shaped bending of thread guard 270', which bending provides an efficient way of inserting sleeve 246 tightly against ball bearing 220 and then automatically retracting to leave clearance 314. Slots 318, which are shown most clearly in FIG. 14, also facilitate the cone-shaped bending. Therefore, the bending of thread guard 270' means that ball bearing 220, sleeve 246, and thread guard 270' may be installed into opening 208 with one application of force that inserts all three parts as an assembly, rather than inserting these parts in separate operations. By inserting the assembly in a single operation, the cost of the wheel may be reduced.

Persons having skill in the art should appreciate that the wheel hub assemblies shown in FIGS. 10–14 have the advantages of bearing heavy loads in both vertical and lateral directions, having low materials and assembly costs, and having low maintenance requirements due to superior protection of the roller bearings from abrasive and corrosive elements.

Figure 8:
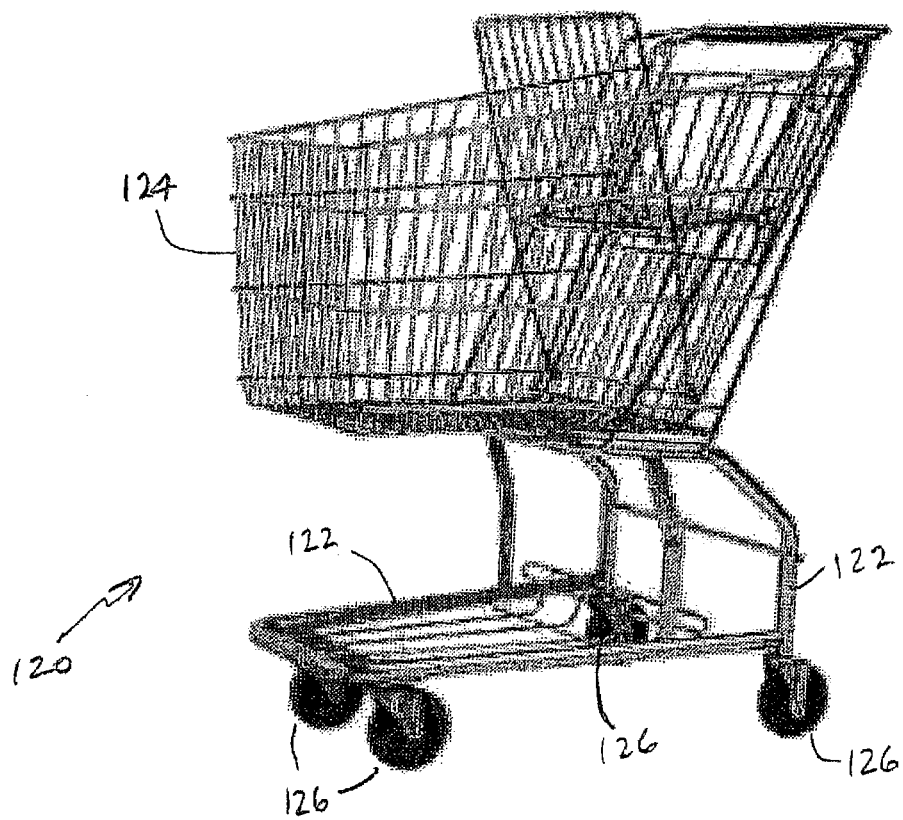
FIG. 8 is a side perspective view of a shopping cart having wheel and hub assemblies according to an embodiment of the present invention.

Referring now to FIG. 8, there is depicted an embodiment of material handling cart in accordance with the present invention. As illustrated, cart 120 includes frame 122, material support structure 124—which may be implemented with a basket, platform, rack, or the like—and wheels 126. Wheels 126 may include a spanner bushing, a bearing, first and second bushings, and a hub, as described above in relation to the embodiments shown in FIGS. 1–7. Wheels 126 may alternatively include both ball bearings and journal bearings as shown in the embodiments of FIGS. 10 through 14. Frame 122 includes vertical and horizontal members that support and bear the load of material placed on material support structure 124, and transfer such load to wheels 126.

Wheels 126 may or may not be mounted to frame 122 with a swivel mounting, depending upon the application of cart 120. For example, if cart 120 is a shopping cart, the front wheels may swivel, and the back wheels may be mounted in a fixed direction.

Figure 9:
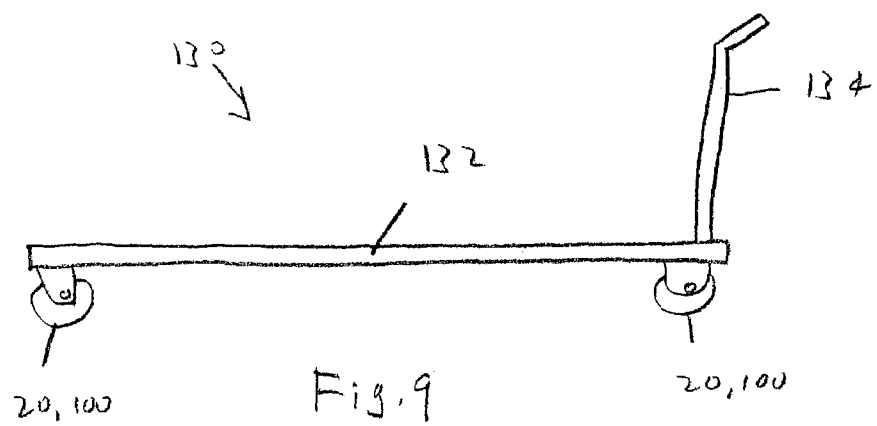
FIG. 9 is a schematic side elevational view of a flat cart with the wheel of an embodiment of the present invention.

FIG. 9 shows a flat cart 130 having a bed 132, for carrying objects, and a handle 134 for use in pushing or pulling the cart. The cart uses the wheels 20 or 100 of the present invention, or wheels having hubs according to the embodiments shown in FIGS. 10 through 14. The cart is designed to carry heavy loads such as lumber. The wheel of the present invention is well suited to the heavy-duty cart.

The wheel, hub, and bearing assemblies of the present invention have the advantages of being easy and inexpensive to manufacture, being nearly maintenance free because the bearing is protected from dirt, water, and other elements, and it is permanently lubricated. The width of bearing assembly 22 and 104 provides a stable, smooth-rolling, and strong hub that is able to support heavy loads, in both a vertical direction (perpendicular to central axis 68) and a lateral direction (e.g., a force at the tread parallel to central axis 68).

In particular, the wheels of FIGS. 10 through 14 are easy to roll over a long life, incur little or no wear, operate quietly and noise free, require no maintenance, have a low cost, and are rust resistant.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A wheel assembly comprising:

a wheel hub having opposing first and second hub faces and a first opening in the first hub face extending from the first hub face along a central axis of the wheel hub;

a first ball bearing having a first inner ring and a first outer ring concentric with the central axis, wherein the first inner ring and the first outer ring are metal, and wherein the first inner ring has a first inner grooved race and the first outer ring has a first outer grooved race, and wherein the width of the first inner ring is greater than the width of the first outer ring, and wherein the first inner ring has an inner ring outside diameter, and wherein the first outer ring is located in the first opening between the first and second hub faces;

a first bearing sleeve in the first opening, wherein the first bearing sleeve is separate from the first ball bearing, and surrounds and contacts a journal surface of the first inner ring to form a first journal bearing, wherein the first journal surface is on a portion of the first inner ring that extends parallel to the central axis from a face of the first outer ring toward the first hub face, and wherein the journal surface has a journal surface diameter substantially equal to the inner ring outside diameter;

a second opening in the second hub face extending from the second hub face along the central axis of the wheel hub;

a second ball bearing having a second inner ring and a second outer ring concentric with the central axis, wherein the second inner ring and the second outer ring are metal, and wherein the second inner ring has a second inner grooved race and the second outer ring has a second outer grooved race, and wherein the width of the second inner ring is greater than the width of the second outer ring, and wherein the second inner ring has the inner ring outside diameter, and wherein the second outer ring is located in the second opening between the first and second hub faces and the second inner ring extends outside the second hub face; and a second bearing sleeve in the second opening, wherein the second bearing sleeve is separate from the second ball bearing, and surrounds and contacts a second journal surface of the second inner ring to form a second journal bearing, wherein the second journal surface is on a portion of the second inner ring that extends parallel to the central axis from a face of the second outer ring toward the second hub face, and wherein the second journal surface has a journal surface diameter substantially equal to the inner ring outside diameter.

2. The wheel assembly according to claim 1, wherein the first ball bearing and the second ball bearing are precision, single row, deep groove ball bearings with integral shafts that are spaced from a medial plane of the wheel, on opposite sides of the medial plane.

3. The wheel assembly according to claim 1, wherein the first inner ring and the second inner ring are in contact and on opposite sides of the medial plane of the wheel.

4. The wheel assembly according to claim 1, further including:

a step around the outer surface of the first inner ring at a distal end of the first inner ring that extends past the journal surface; and a thread guard contacting the step on the first inner ring, wherein the thread guard extends radially from the first inner ring and toward a medial plane of the wheel hub inside the plane of the first hub face.

5. The wheel assembly according to claim 1, wherein the first ball bearing is a self-contained, precision ball bearing unit.

6. The wheel assembly according to claim 1, wherein the first bearing sleeve further includes ribs on an outer perimeter surface for holding the sleeve in the first opening.

7. The wheel assembly according to claim 1, wherein the first bearing sleeve further includes a non-cylindrical outer perimeter surface.

8. A wheel assembly comprising:
   a wheel hub having opposing first and second hub faces and first and second openings in the first and second hub faces, each concentric with and extending along a central axis of the wheel hub;
   first and second precision ball bearings in the first and second openings, respectively, the ball bearings each having a metal inner ring and an outer ring concentric with the central axis, wherein each metal inner ring has a grooved inner ring race and each outer ring has a grooved outer ring race, and wherein the width of each metal inner ring is greater than the width of each outer ring, and wherein each metal inner ring contacts the other, and wherein each outer ring is spaced apart from the other and located entirely between planes of the first and second hub faces; and
   first and second bearing sleeves in the first and second openings, respectively, wherein each bearing sleeve has a sleeve opening therethrough forming a journal bearing surface that is independent of either the first or second precision ball bearings, so that each bearing sleeve surrounds and contacts a journal surface of each metal inner ring to form first and second journal bearings, wherein each journal surface is on a portion of each metal inner ring that extends parallel to the central axis from an outer face of each outer ring away from a medial plane of the hub.

9. The wheel assembly according to claim 8, further including:
   a step around the outer surfaces of each metal inner ring at distal ends of each metal inner ring extending past each journal surface; and
   first and second thread guards contacting each step on each metal inner ring, wherein each thread guard extends radially from each metal inner ring and toward the medial plane of the wheel hub to points inside the plane of the first hub face.

10. The wheel assembly according to claim 9, wherein the thread guard includes a thread guard inner face and a ridge that are on either side of a groove, wherein the thread guard bends at the groove, allowing the ridge to move toward the medial plane as the thread guard inner face contacts a stop formed by the step of the metal inner ring.

11. The wheel assembly according to claim 8 wherein each outer ring is separated from the other by, and is in contact with, a hub member.

12. The wheel assembly according to claim 8, wherein the first and second ball bearings are precision self-contained, metal, single row, deep groove ball bearing units with integral shafts.

13. The wheel assembly according to claim 8, wherein the first and second bearing sleeves further include ribs on the outer perimeter surfaces of the bearing sleeves for holding the bearing sleeves in the first and second openings.

14. The wheel assembly according to claim 8, wherein the first and second bearing sleeves are secured to the hub for supporting and retaining first and second ball bearings in the hub.

15. A wheel assembly comprising:
   wheel hub having opposing first and first and second openings in the first and second hub faces, each concentric with and extending along a central axis of the wheel hub;
   first and second precision ball bearings in the first and second openings, respectively, the ball bearings each having a metal inner ring and an outer ring concentric with the central axis, wherein each metal inner ring has a grooved inner ring race and each outer ring has a grooved outer ring race, and wherein the width of each metal inner ring is greater than the width of each outer ring, and wherein each metal inner ring contacts the other, and wherein each outer ring is spaced apart from the other and located entirely between planes of the first and second hub faces; and
   first and second bearing sleeves in the first and second openings, respectively, wherein each bearing sleeve has a sleeve opening therethrough forming a journal bearing surface that is independent of either the first or second precision ball bearings, so that each bearing sleeve surrounds and contacts a journal surface of each metal inner ring to form first and second journal bearings, wherein each journal surface is on a portion of each metal inner ring that extends parallel to the central axis from an outer face of each outer ring away from a medial plane of the hub, and wherein the first and second bearing sleeves include a non-cylindrical outer surface and a slot for allowing the first and second bearing sleeves to constrict around each journal surface.

16. A wheel assembly comprising:
   a wheel hub having opposing first and second hub faces and first and second openings in the first and second hub faces, each concentric with and extending along a central axis of the wheel hub;
   first and second precision ball bearings in the first and second openings, respectively, the ball bearings each having a metal inner ring and an outer ring concentric with the central axis, wherein each metal inner ring has a grooved inner ring race and each outer ring has a grooved outer ring race, and wherein the width of each metal inner ring is greater than the width of each outer ring, and wherein each metal inner ring contacts the other, and wherein each outer ring is spaced apart from the other and located entirely between planes of the first and second hub faces; and
   first and second bearing sleeves in the first and second openings, respectively, wherein each bearing sleeve has a sleeve opening therethrough forming a journal bearing surface that is independent of either the first or second precision ball bearings, so that each bearing sleeve surrounds and contacts a journal surface or each metal inner ring to form first and second journal bearings wherein each journal surface is on a portion of each metal inner ring that extends parallel to the central axis from an outer face of each outer ring away from a medial plane of the hub;
   a step around the outer surfaces of each metal inner ring at distal ends of each metal inner ring extending past each journal surface; and
   first and second thread guards contacting each step on each metal inner ring, wherein each thread aud extends radially from each metal inner ring and toward the medial plane of the wheel hub to points inside the plane of the first hub face, and wherein the thread guards include a thread guard inner face and a ridge that are on opposite sides of a groove, wherein the ridge includes a slot radially through the ridge, and wherein the thread guard bends at the groove, allowing the ridge to move toward the medial plane as the thread guard inner face contacts a stop formed by the step of the metal inner ringer.

17. A material handling cart comprising;
a frame;
a material support structure coupled to the frame;
a plurality of wheels coupled to the frame, wherein one of the wheels includes:
- a wheel hub having opposing first and second hub faces and first and second openings in the first and second hub faces, each concentric with and extending along a central axis of the wheel hub;
- first and second precision ball bearings in the first and second openings, respectively, the ball bearings each having a metal inner ring and an outer ring concentric with the central axis, wherein each metal inner ring has a grooved inner ring race and each outer ring has a grooved outer ring race, and wherein the width of each metal inner ring is greater than the width of each outer ring, and wherein each metal inner ring contacts the other, and wherein the each outer ring is spaced apart from the other and located entirely between planes of the first and second hub faces; and
- first and second bearing sleeves in the first and second openings, respectively, wherein each bearing sleeve has a sleeve opening therethrough forming a journal bearing surface that is independent of either the first or second precision ball bearings, so that each bearing sleeve surrounds and contacts a journal surface of each metal inner ring to form first and second journal bearings, wherein each journal surface is on a portion of each metal inner ring that extends parallel to the central axis from an outer face of each outer ring away from a medial plane of the hub.

18. The material handling cart according to claim 17, wherein the one of the wheels further includes:
- a step around the outer surfaces of each metal inner ring at distal ends of each metal inner ring extending past each journal surface; and
- first and second thread guards contacting each step on each metal inner ring, wherein each thread guard extends radially from each metal inner ring and toward the medial plane of the wheel hub to points inside the plane of the first hub face.

19. The material handling cart according to claim 17, wherein the one of the wheels further includes a hub member separating each outer ring from the other, wherein each outer ring is in contact with the hub member.

20. The material handling cart according to claim 17, wherein the first and second ball bearings in the one of the wheels further includes first and second precision, self-contained, metal, single row, deep groove ball bearing units with integral shafts.

21. A method of making a wheel comprising the steps of:
pressing first and second ball bearings into first and second openings in a wheel hub, wherein the first and second openings extend from first and second opposing hub faces along a central axis of the wheel hub, and wherein the first and second ball bearings each have a metal inner ring and an outer ring concentric with the central axis, and wherein a width of each of the metal inner rings is greater than a width of each of the respective outer rings, and wherein the metal inner rings have an inner ring outside diameter, and wherein the metal inner rings contact one another at one end, and are positioned so that the other end is structured and arranged outside the first and second hub faces to contact a yoke that exerts a compressive force along the inner rings, and the outer rings are located entirely between planes of the first and second hub faces and each contacts a stop shoulder that serves to separate the outer rings by a distance to provide lateral stability; and
pressing first and second bearing sleeves into the first and second openings, adjacent to the ball bearings, wherein each bearing sleeve has a sleeve opening therethrough with a sleeve opening diameter substantially equal to the inner ring outside diameter, and wherein each bearing sleeve surrounds and contacts a journal surface of each metal inner ring to form journal bearings, wherein the journal surfaces are on portions of the metal inner rings that extend parallel to the central axis from an outer face of each outer ring away from a medial plane of the hub.

22. The method of making a wheel according to claim 21, further including the step of installing a thread guard attached to the first metal inner ring, wherein the thread guard extends radially from the first metal inner ring and toward the medial plane of the wheel hub inside the plane of the first hub face.

23. The method of making a wheel according to claim 22, wherein the step of deforming the thread guard further includes bending the thread guard at a groove to allow a ridge to extend past the stop while contacting a sleeve outer surface.

24. The method of making a wheel according to claim 22, wherein the step of installing a thread guard attached to the first metal inner ring further includes the steps of:
- sliding the thread guard onto a step to make contact with a stop on a distal end of the first metal inner ring;
- deforming the thread guard to contact and press the bearing sleeve past the stop along the central axis; and
- allowing the thread guard to reform, leaving a clearance between the thread guard and the bearing sleeve.

25. The method of making a wheel according to claim 21, wherein the steps of pressing a first ball bearing, pressing a first bearing sleeve, and installing a thread guard are all performed with a single application of force that presses a pre-assembled ball bearing, bearing sleeve and thread guard toward the first opening.

26. A wheel assembly comprising:
- a wheel hub having opposing first and second hub faces;
- first and second openings in the first and second hub faces, wherein the first and second openings are concentric with, and extend along, a central axis of the wheel hub, and wherein a diameter of the first and second openings is reduced as the openings extend from the respective first and second hub faces toward a medial plane of the wheel hub, thereby forming a ridge hub member having opposing first and second ridge faces within the first and second openings; and
- first and second rolling element bearings located in the first and second openings, respectively, wherein each rolling element bearing has a metal inner ring and an outer ring that are concentric with the central axis, wherein each metal inner ring has an inner grooved race and each outer ring is cylindrical and has an outer grooved race, and wherein the width of each metal inner ring is greater than the width of each outer ring, and wherein each metal inner ring contacts the other, and wherein the first and second outer rings are spaced apart from the other, and each outer ring has an outer ring end that directly contacts less than all of a respective one of the first and second ridge faces of the ridge hub member, and each outer ring is located between planes of the first and second hub faces, and has an outer cylindrical surface that contacts an inner surface of the respective one of the first and second openings.

27. The wheel assembly according to claim 26 wherein the first and second rolling element bearings further include first and second precision grooved-race ball bearings.

28. The wheel assembly according to claim 26 wherein the first and second openings have a larger diameter portion that extends inward from each hub face toward the medial plane, and wherein the first and second openings have a smaller diameter portion that extends inward from each larger diameter portion toward the medial plane, and wherein each larger diameter portion is substantially equal to an outer diameter of the first and second outer rings, and wherein each smaller diameter portion is substantially equal to an outer diameter of the first and second metal inner rings.

29. The wheel assembly according to claim 26 wherein the first and second rolling element bearings are press-fit into the first and second openings, wherein the outer ring end of each of the first and second outer rings is seated against a respective one of the first and second ridge faces of the ridge hub member.

30. The wheel assembly according to claim 26 wherein an end of the first metal inner ring is in contact with an end of the second metal inner ring.

31. The wheel assembly according to claim 26 wherein a width of the ridge hub member is greater than or equal to a width of the first and second outer rings.

32. The wheel assembly according to claim 26 wherein outer ring ends of the first and second outer rings are spaced apart about 0.625 inches.

33. The wheel assembly according to claim 26 wherein a portion of the first and second ridge faces of the ridge hub member is not in contact with the outer ring ends of the first and second outer rings.

34. The wheel assembly according to claim 26 wherein each of the first and second metal inner rings is cylindrical, and each has a first inner ring end in contact with a respective first inner ring end of other metal inner ring, and each has a second inner ring end that extends outward past a plane of the respective first and second hub faces.

35. The wheel assembly according to claim 26 further including a yoke having a pair of yoke legs, an axle, and an axle nut, wherein the axle passes through a hole in one yoke leg, first and second metal inner rings, and a hole in the other yoke leg, and wherein the axle and axle nut compresses the first and second metal inner rings against each other and against a respective yoke leg.

* * * * *